(No Model.)
H. A. JAMIESON.
Steam Piston.
No. 229,613.                  Patented July 6, 1880.
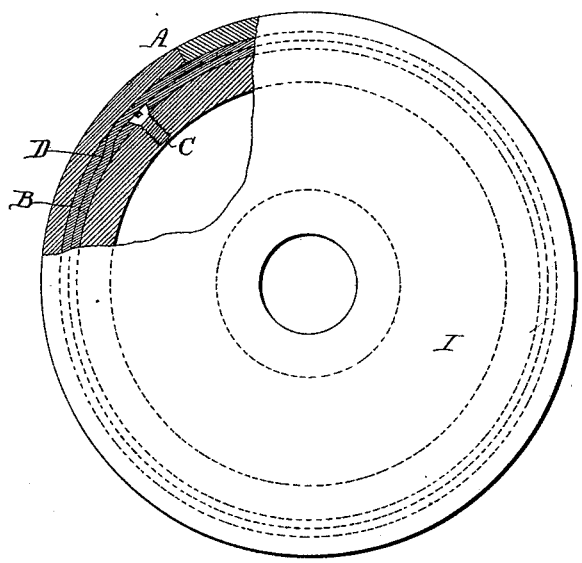
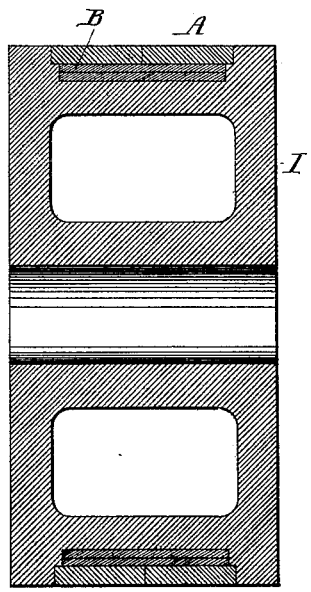
Attest:
Courtney A. Cooper.
William Paxton
Henry A. Jamieson
By his attorney
Charles E. Foster

UNITED STATES PATENT OFFICE.

HENRY A. JAMIESON, OF BROOKLYN, NEW YORK.

STEAM-PISTON.

SPECIFICATION forming part of Letters Patent No. 229,613, dated July 6, 1880.

Application filed April 23, 1880. (No model.)

*To all whom it may concern:*

Be it known that I, HENRY A. JAMIESON, of Brooklyn, Kings county, New York, have invented an Improvement in Steam-Pistons, of which the following is a specification.

My invention is a piston constructed, as fully described hereinafter, so as to secure a tight joint between the periphery and the cylinder without undue friction or the use of complicated and expensive appliances.

In the drawings forming part of this specification, Figure 1 is a longitudinal section of a piston illustrating my improvement. Fig. 2 is an end view, partly in section.

The body I of the piston is constructed in any suitable manner, and has a peripheral groove for the reception of the iron packing-ring A, and a deeper groove, within which lies the spring B. This spring consists of a plate, coiled as shown, the inner end being secured, by a screw, C, or otherwise, within the groove of the piston, the strip being then carried round in said groove, curved or bent opposite the end, so as to form a second coil parallel with and lying on the first, and terminating at the bent portion D, thus forming a continuous spring-ring, coinciding exactly with a circle, but of two or more layers and of uniform thickness.

In constructing the packing-ring A it is first turned to a size corresponding to the bore of the cylinder, cut transversely, and then sprung over the elastic coil, which is made of brass or other spring metal, and by its tendency to uncoil or expand forces the iron packing-ring into steam-tight contact with the cylinder with a pressure substantially uniform throughout its whole extent.

By this simple construction a close joint is secured at comparatively little expense, and the device is durable, not likely to get out of order, nor to wear unequally.

I am aware that a piston-head has been provided with a coiled spring, which forms a part of the periphery of the head and bears against the cylinder, as shown in Letters Patent No. 147,643, granted to me February 17, 1874, and I do not claim, broadly, the use of such coiled spring in a piston-head; but

I claim—

1. The combination, in a piston, of a grooved head, I, carrying packing-rings, and a spring consisting of a single strip of uniform thickness, bent and coiled upon itself, as shown, and interposed between the piston and packing-ring, substantially as set forth.

2. The combination of the grooved piston-head, continuous spring-ring B, of uniform thickness, secured at one end to the head, and coiled and folded as set forth, and the outer split packing-ring, A, substantially as specified.

In testimony whereof I have signed my name to this specification in the presence of two subscribing witnesses.

HENRY A. JAMIESON.

Witnesses:
EDWARD TUSCH,
GEORGE H. PRICE.